Figure 1:
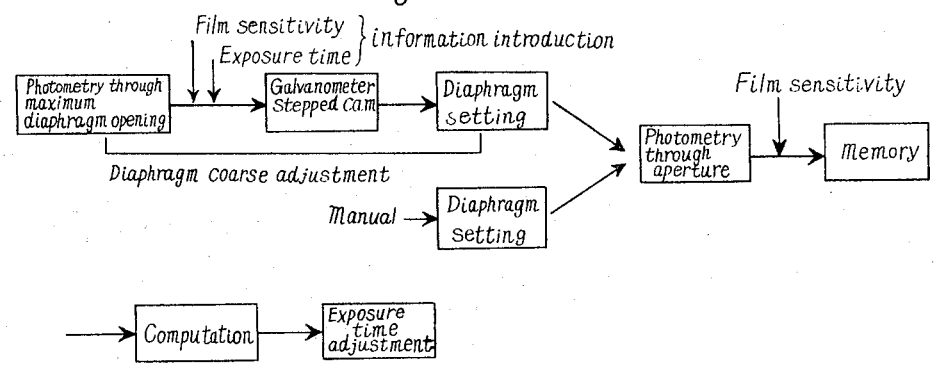

United States Patent [19]
Uchida et al.

[11] 3,871,005
[45] Mar. 11, 1975

[54] AUTOMATIC EXPOSURE CONTROL MEANS FOR A CAMERA

[75] Inventors: Yasuo Uchida; Yoshitaka Kuroyanagi, both of Tokyo, Japan

[73] Assignee: Konishiroku Photo Industry Co., Ltd., Tokyo, Japan

[22] Filed: Nov. 14, 1972

[21] Appl. No.: 306,393

[30] Foreign Application Priority Data
Nov. 17, 1971 Japan .............................. 46-91479
Feb. 17, 1972 Japan .............................. 47-16649

[52] U.S. Cl. ...................... 354/38, 354/31, 354/42, 354/43, 354/50, 354/51
[51] Int. Cl. ............................................. G03b 7/08
[58] Field of Search ......... 95/10 CE, 10 CT, 10 CD, 95/10 PO; 354/31, 38, 42, 43, 50, 51

[56] References Cited
UNITED STATES PATENTS

| | | | |
|---|---|---|---|
| 3,433,140 | 3/1969 | Wick et al. | 95/10 CT |
| 3,545,350 | 12/1970 | Gross | 95/10 CT |
| 3,603,799 | 9/1971 | Nobusawa | 95/10 CT |
| 3,691,917 | 9/1972 | Uchida et al. | 59/10 CT |
| 3,695,158 | 10/1972 | Fahlenberg | 95/10 CE |

Primary Examiner—Samuel S. Matthews
Assistant Examiner—Russell E. Adams
Attorney, Agent, or Firm—Bierman & Bierman

[57] ABSTRACT

Automatic exposure time control circuit for a camera having coarse exposure adjusting means that can be moved from a fully opened to a preset aperture setting upon operation of the camera release and fine exposure adjusting means that measures the light passing through the preset aperture of the lens and determines the actual exposure time in response to the light measured.

3 Claims, 8 Drawing Figures

3,871,005

AUTOMATIC EXPOSURE CONTROL MEANS FOR A CAMERA

This invention relates to an automatic exposure control means for a camera in which the so-called electronic shutter is incorporated. More particularly, it relates to an automatic exposure control means for obtaining a proper exposure by previously giving exposure information such as exposure time, film sensitivity and so on to, for example, a galvanometer or an electric circuit which serves to drive the said galvanometer, subsequently measuring the amount of light having passed through a diaphragm opening adjusted (coarse adjustment of aperture) by the known exposure control method to detect the position of the galvanometer pointer by means of a photoelectric element provided on a film plane or in a viewfinder optical system, and adjusting the speed of the electronic shutter in accordance with the measured value of light having passed through the coarsely adjusted aperture.

In the automatic exposure control cameras that have been available heretofore, the known method adopted is such that exposure factors other than aperture value, for example, exposure time and film sensitivity are set first, thereby deflecting a galvanometer pointer in accordance with the brightness of an object and said set exposure factors, and then the position of the galvanometer pointer is detected by means of stepped teeth whereby an aperture value is determined. An alternate method is that an exposure time is adjusted by applying the output of a photoelectric element, which is capable of responding to the brightness of an object, to a time control circuit including resistors of which are variable depending on the aperture value and film sensitivity. In the mechanical method, however, there is a disadvantage that the proper exposure cannot be obtained due to insufficient accuracy caused by low precision in machining the diaphragm and by an error resulting from the number of stepped teeth. The electrical method has an operational restriction of giving priority to selection of aperture, and also has a demerit that the intensity of light striking onto a light receiving member at the measurement time is different from that at the exposure time. In the method to measure the light having passed through the lens, that is, in the case of what is known as TTL measurement, it is usually necessary to once memorize the brightness of an object because the light striking onto a photoelectric element is intersected upon the exposure. Normally, the memory is required to cover a wide brightness range of the object from 1 to $2^{18}$ rlx, so that means for logarithmic compression or the like is necessary. As the result, there occurs the possibility of an error with respect to the memory. Further, in the method to measure the light by closing down the diaphragm to a predetermined value, there is a great operational disadvantage that the sight of the finder becomes dark, so that this makes preliminary operations such as focussing difficult.

The object of this invention resides in eliminating all the above-described demerits and thereby providing an exposure control method which is advantageous in view of both camera operation and exposure accuracy. According to the present invention, first the information of shutter speed and film sensitivity is given to a mechanism serving to detect the brightness of an object, and the diaphragm opening is determined by the known method. For example, the information of shutter speed and film sensitivity is introduced through the rotation of a galvanometer, and subsequently the position of a galvanometer pointer determined by a galvanometer circuit containing a photoelectric element is detected by means of stepped teeth, and then the diaphragm opening is determined according to the position of the pointer. (This is termed coarse adjustment of aperture.) The above process may be effected by the other known method.

Subsequently, in the process of release, the diaphragm is closed down to an actual photographing state. The light having passed through the diaphragm opening is measured by the photoelectric element provided on a film plane or in a viewfinder optical system. It is preferable that the photoelectric element has a high response speed, as silicon cell or selenium cell. As required, the value of light thus measured or a corresponding value is memorized or held, and a time control circuit is driven in accordance with said memorized or held value, so that a proper exposure time is adjusted. The exposure time adjusted and determined in this stage is different from the value preset by the information of exposure time introduced previously at the time of coarse aperture adjustment, by the amount corresponding to the difference between the coarsely adjusted aperture and the proper aperture. But since the difference is approximately no more than 1 EV at most, this method may be regarded as exposure time preferential selection, and a remarkably high exposure accuracy can be attained because the aperture error is corrected by the exposure time. Moreover, due to instantaneous through-the-aperture light measurement, it is possible to perform the preferable operation of focussing with the fully open diaphragm and light measurement through the aperture, while eliminating the conventional operational inconvenience. As compared with light measurement through the fully open diaphragm in which the measuring range to be covered is normally from 1 to $2^{18}$ rlx (18 EV), there is an advantage that the required range may be approximately 10 EV corresponding to the exposure time, so that memory or holding is rendered easy. Furthermore, by setting the shutter speed (for example, through selection of the resistance of a time-constant circuit consisting of resistor and capacitor) simultaneously with introduction of the shutter speed information at the time of coarse aperture adjustment, and also by applying the shutter speed information to the through-the-aperture light measuring circuit, then the requirement is to memorize or hold only the value corresponding to the apperture error, so that the memory or holding circuit can be simplified.

In case the aperture coarse adjustment is made manually, the circuit will serve as an automatic exposure control circuit based on the so-called aperture preferential selection.

FIG. 1 is a block diagram composed on the basic of the above-described system.

Figure 2:
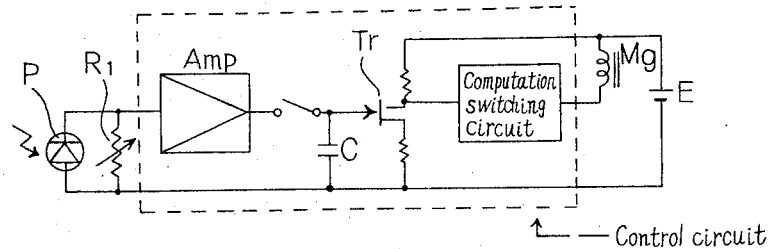

FIG. 2 shows an exemplary basic configuration of a time control circuit serving to adjust the shutter speed through measurement of the light having passed through the coarsely adjusted aperture. In this drawing: P is a photoelectric element such as silicon or selenium cell; $R_1$ is a load resistor for the photoelectric element, serving also as a film sensitivity setting variable resistor; Amp is a preamplifier; C is a memory capacitor; Tr is a field effect transistor; Mg is a magnet; and E is a power source. After coarse adjustment of the aperture by the known method, the light having passed through the diaphragm opening is received by photoelectric element P, and subsequently the voltage, which corresponds to the product of the output current from P and the load resistance $R_1$ having the film sensitivity information, is amplified by Amp and then is memorized by memory capacitor C. The capacitor voltage is detected by means of field-effect transistor Tr, and through a switching circuit, the magnet Mg serving to release the electronic shutter curtain is energized (or deenergized), so that the exposure time corresponding to the capacitor voltage is resulted.

Figure 3:
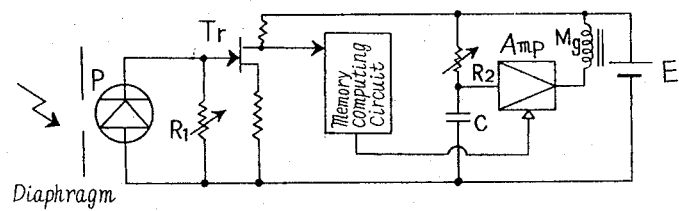

FIG. 3 shows another example of basic configuration for adjusting the exposure time, in which P is a photoelectric element; $R_1$ is a load resistor for the photoelectric element, and serves to introduce the information of film sensitivity and exposure time; Tr is an element having high input impedance such as a field-effect transistor; $R_2$ is an exposure time setting resistor; C is a capacitor forming a time-constant circuit in combination with $R_2$; Amp is an amplifier switching circuit for operating a magnet Mg by the time-constant circuit; Mg is a magnet serving to release the shutter curtain; and E is a power source. Setting the exposure time comes to set both resistors $R_1$ and $R_2$ simultaneously, and the voltage, which corresponds to the product of the output current from photoelectric element P and resistor $R_1$ having the information of film sensitivity and exposure time, is detected as an input to the field-effect transistor Tr. Then, the deviation from the proper value is memorized by the memory circuit, and this deviation is applied, as a correction signal, to the amplifier switching circuit Amp.

Figure 4:
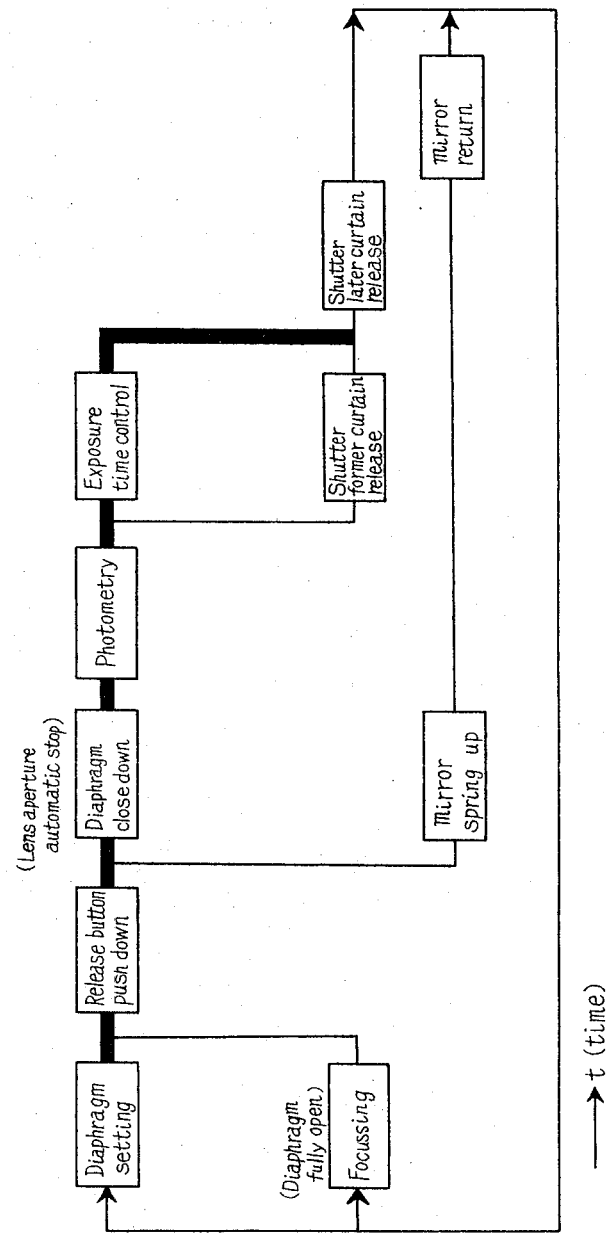

FIG. 4 is a block diagram of exemplary camera operation following the aperture coarse adjustment, wherein the processes are illustrated sequentially with respect to time.

Figure 5:
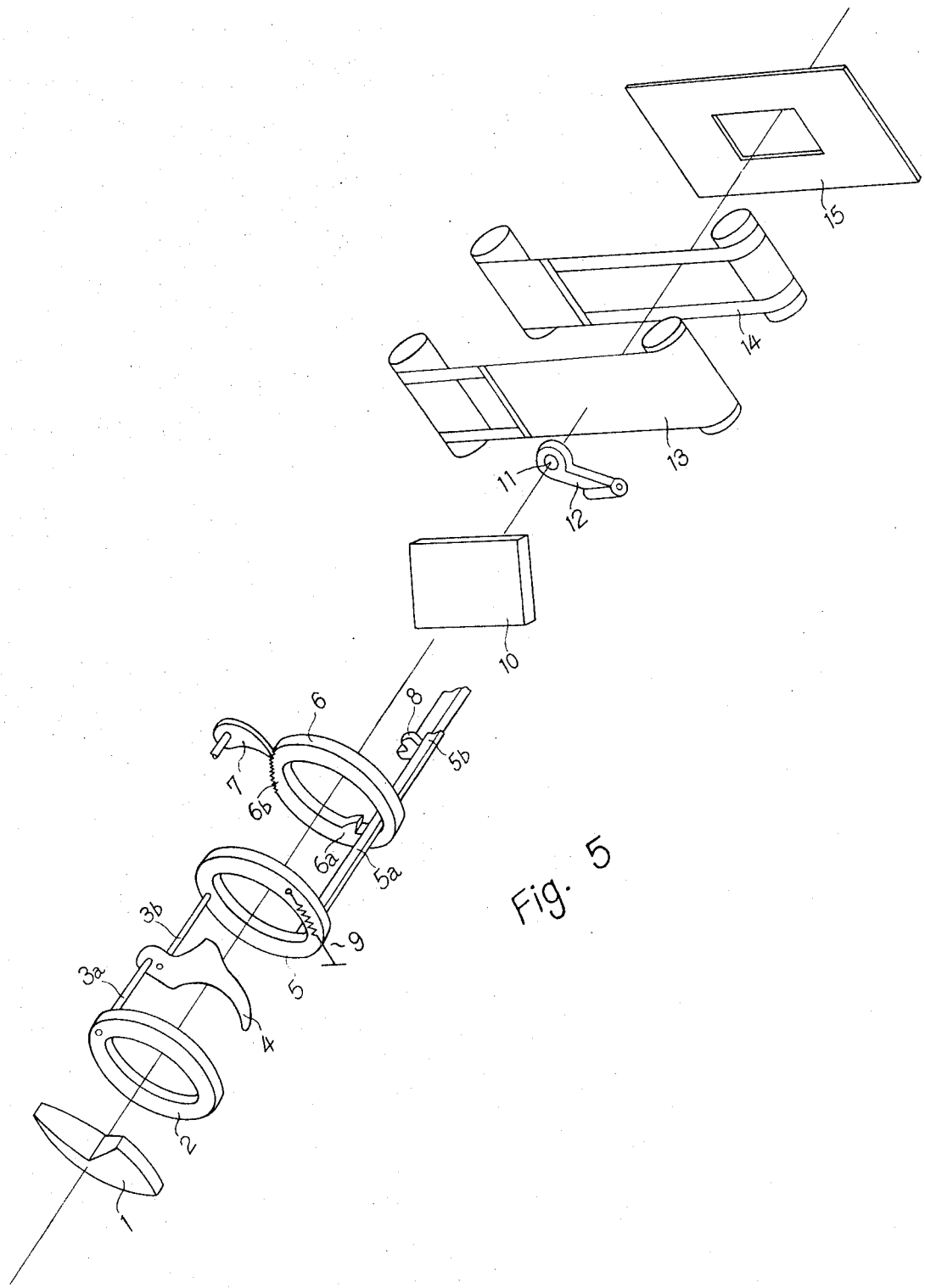

FIG. 5 is a perspective exploded view of an exemplary embodiment after the aperture coarse adjustment. A fixed diaphragm ring 2 and a moving diaphragm ring 5 located behind an object lens 1 have diaphragm blade drive pins 3a and 3b as illustrated, and serve to actuate a diaphragm blade 4. The moving diaphragm ring 5 has an arm 5a, whose end 5b is brought into contact with a lens drum connecting lever 8 against the force of a spring 9 energized in the close-down direction when the lens drum is mounted on a camera body. Accordingly, after the lens drum has been mounted, the diaphragm is always held in its fully open position, so that the viewfinder field is always kept light.

At the time of photographing, a preset ring 6 is previously rotated clockwise in accordance with the brightness of an object so as to set the diaphragm by engaging a stopper 7 with a notch 6b corresponding to the aperture value. After completion of focussing with the diaphragm being fully open, pushing a release buttom (not shown) permits a quick return mirror 10 to spring up, and simultaneously causes the lens drum connecting lever to separates from the end 5b of arm 5a of the moving diaphragm ring 5, so that the pulling force of the spring 9 being energized in the close-down direction is exerted to rotate the moving diaphragm ring 5 clockwise until the arm 5a comes to butt against the protrusion 6a of the preset ring 6, and thus the diaphragm is closed down to the desired value.

Then, the light having passed through the closed-down diaphragm opening strikes onto a photoelectric element 11 which has a high response speed to light and is located on the optical axis right in front of a shutter former curtain 13, and thus the amount of light is measured. Immediately before the shutter former curtain starts moving, a light receiver 12 is retracted out of the photographing light path, and exposure of a film started through an aperture 15.

Subsequently, a time limit means for controlling the exposure time is placed in operation, and a shutter later curtain 14 is closed to terminate the film exposure. Then, according to the information of the shutter later curtain, the quick return mirror 10 and the light receiver 12 are returned respectively to the former state.

Figure 6:
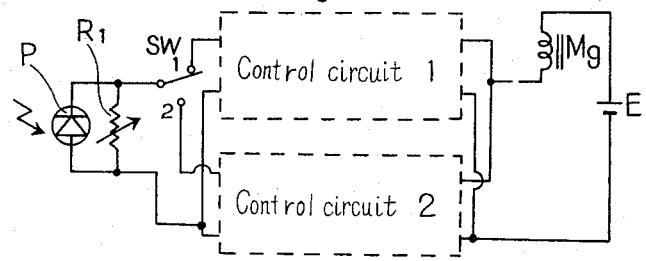

FIG. 6 shows a parallel connection of two control circuits having the basic configuration of FIG. 2, wherein either circuit can be selected by means of a manual selector switch SW in accordance with the intensity of a photoelectric current obtained from the photoelectriic element P. It is also possible to interlock the manual selector switch SW with shutter setting or diaphragm presetting operation.

Figure 7:
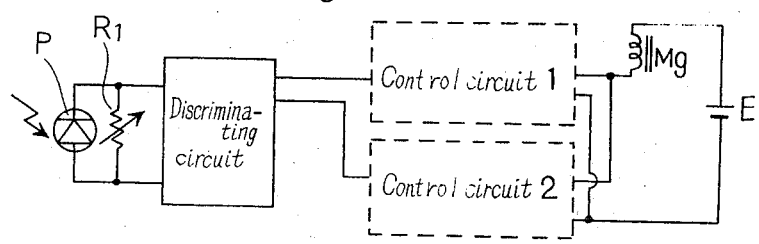

FIG. 7 is a circuit diagram showing the case where a discriminating circuit is attached so as to perform automatic selection of the control circuits.

Figure 8:
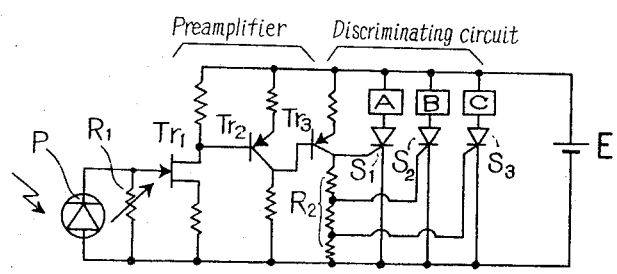

FIG. 8 shows an example embodying the discriminating circuit, in which P is a photoelectric element; $R_1$ is a resistor for film sensitivity; $Tr_1$ is a field-effect transistor; and $Tr_2$ and $Tr_3$ are transistors. A preamplifier is formed by $Tr_1$, $Tr_2$ and $Tr_3$, and a current flowing in a resistor $R_2$ depends on the photoelectric current. $S_1$, $S_2$ and $S_3$ are silicon controlled rectifiers, whose respective gates are connected to the division points of resistor $R_2$. A, B and C show control circuits 1, 2 and 3 respectively, and a discriminating circuit is formed by resistor $R_2$ and silicon controlled rectifiers $S_1$, $S_2$ and $S_3$. E is a power source. Explanation will now be given on how automatic switching of the discriminating circuit is performed. The output of photoelectric element P is amplified by means of preamplifier, and a voltage is generated at each division point of the resistor $R_2$ by the output current from the final-stage transistor $Tr_3$. Out of $S_1$, $S_2$ and $S_3$, only those, to whose gates the turning-on voltages are applied in accordance with the voltages produced at the respective points, are turned on. $S_1$, $S_2$ and $S_3$ function as switches for the control circuits A, B and C respectively, so that only the control circuit turned on by $S_1 S_2$ or $S_3$ is placed in operation. In the embodiment shown here, three cases can be considered with regard to the control circuits operation: that is, the case where only A is turned on, the case where only A and B are turned on, and the case where all of A, B and C are turned on. However, by predetermining the priority order of operation among the control circuits A, B and C, exposure time can be controlled by the use of one control circuit alone. Further, when it is desired to turn on only B or C, the circuit configuration can be so changed as to meet the requirement.

In view of the above-described composition, the present invention has the following features.

1. Exposure time control is effected by introducing the information of film sensitivity and exposure time, subsequently setting the diaphragm automatically to the value corresponding to the brightness of an object, measuring the amount of the light having passed through the diaphragm opening, and selecting the most suitable control circuit manually or automatically in accordance with the intensity of the current proportional to the measured amount of the light. Since the exposure time controlled is the value corrected only by the aperture error from the value preset in a galvanometer, this method may be regarded as exposure time preferential selection.

2. Exposure time control can also be effected by presetting the diaphragm, and then selecting the most suitable control circuit manually or automatically in accordance with the intensity of the current proportional to the amount of the light having passed through the diaphragm opening. In other words, it is also possible to perform aperture preferential selection.

3. A high exposure accuracy can be attained because the light is measured through the diaphragm opening and the mechanical error of the diaphragm is adjusted by the shutter speed.

4. Instead of using a wide-range amplifier, this invention employs a combination of amplifiers covering a certain specific range such as: (Approximate number of steps ranging from 1 to $2^{10}$) ÷ (Number of amplifiers). Therefore, exposure time can be controlled in a range from 1 to 1/1000 second without logarithmic amplification.

5. Because of "through-the-aperture" (TTA) system, brightness step can be compressed to exposure time step. Accordingly, switching of amplifier and control circuits is rendered simple. Though a plurality of amplifier and control circuits are required, the configuration can be simplified since each circuit covers a narrow range.

6. When the memory and time control circuits are made automatically selectable according to the output of the photoelectric element, automatic exposure control is rendered possible in either exposure time preferential or aperture preferential photographing operation, so that this invention is applicable to de luxe cameras.

What we claim is:

1. An automatic exposure control means for a camera comprising first exposure adjusting means having a diaphragm which is preset and moved from a full opened state to a reduced state upon camera release operation, said first exposure adjusting means comprising a first light measuring member and means responsive to the output from said first light measuring member for presetting the aperture value, second exposure adjusting means comprising a second light measuring member for receiving light which has passed through the reduced aperture and means for determining an exposure time in response to the output from said second light measuring member.

2. An automatic exposure control means for a camera according to claim 1, wherein said second exposure determining means comprises means for memorizing the output from said second light, measuring member.

3. An automatic exposure control means for a camera comprising first exposure adjusting means having a diaphragm which is preset and moved from a full opened state to a reduced state upon camera release operation, and second exposure adjusting means having a member for measuring the light having passed through the reduced aperture, means for determining an exposure time in response to the output of said light measuring member, said exposure time determining means being preset manually to effect a first exposure time, and means for changing the exposure time determined by said exposure time determining means to a second exposure time in response to the output of said light measuring member.

* * * * *